(12) United States Patent
Takemori

(10) Patent No.: US 12,409,683 B2
(45) Date of Patent: Sep. 9, 2025

(54) PNEUMATIC TIRE

(71) Applicant: The Yokohama Rubber Co., LTD., Kanagawa (JP)

(72) Inventor: Ryohei Takemori, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 55 days.

(21) Appl. No.: 18/547,626

(22) PCT Filed: Jan. 27, 2022

(86) PCT No.: PCT/JP2022/003017
§ 371 (c)(1),
(2) Date: Aug. 23, 2023

(87) PCT Pub. No.: WO2022/185801
PCT Pub. Date: Sep. 9, 2022

(65) Prior Publication Data
US 2024/0300267 A1 Sep. 12, 2024

(30) Foreign Application Priority Data
Mar. 4, 2021 (JP) .................. 2021-034166

(51) Int. Cl.
*B60C 11/03* (2006.01)
*B60C 11/04* (2006.01)
(52) U.S. Cl.
CPC ....... *B60C 11/04* (2013.01); *B60C 2011/0346* (2013.01); *B60C 2011/0353* (2013.01)

(58) Field of Classification Search
CPC . B60C 11/04; B60C 11/03; B60C 2011/0353; B60C 2011/0341
See application file for complete search history.

(56) References Cited

U.S. PATENT DOCUMENTS

2020/0247188 A1* 8/2020 Horiguchi ........... B60C 11/1236

FOREIGN PATENT DOCUMENTS

| EP | 1926610 B1 * | 11/2011 | ......... B60C 11/0309 |
|----|----|----|----|
| JP | 2010-215221 A | 9/2010 | |
| JP | 2012-201335 A | 10/2012 | |
| JP | 5413500 B2 | 2/2014 | |
| JP | 2019-001406 A | 1/2019 | |
| JP | 2019-051834 A | 4/2019 | |

(Continued)

*Primary Examiner* — Cedrick S Williams
(74) *Attorney, Agent, or Firm* — Thorpe North & Western

(57) ABSTRACT

A pneumatic tire includes inner intermediate lug grooves having a length L1 and outer intermediate lug grooves having a length L2 formed in inner and outer intermediate land portions, respectively, where lengths L1 and L2 satisfy L1>L2. Distances W1, W2, W3, and W4 from a tire equator to an inner shoulder main groove, an inner center main groove, an outer center main groove, and an outer shoulder main groove, respectively, satisfy $0.58 \leq W1/Wi \leq 0.62$, $0.20 \leq W2/Wi \leq 0.24$, $0.15 \leq W3/Wo \leq 0.19$, and $0.53 \leq W4/Wo \leq 0.57$ with respect to distances Wi, Wo from the tire equator to ground contact edges. A total value of a groove width WG1 of the inner shoulder main groove and a groove width WG2 of the inner center main groove is larger than a total value of a groove width WG3 of the outer center main groove and a groove width WG4 of the outer shoulder main groove.

23 Claims, 3 Drawing Sheets

(56) References Cited

FOREIGN PATENT DOCUMENTS

| WO | 2019/151333 A1 | 8/2019 |
| WO | 2020/130058 A1 | 6/2020 |
| WO | 2020/153011 A1 | 7/2020 |

* cited by examiner

PNEUMATIC TIRE

TECHNICAL FIELD

The present technology relates to a pneumatic in which four main grooves are provided in a tread portion and particularly relates to a pneumatic tire whereby steering stability, noise performance, and drainage performance can be improved in a well-balanced manner.

BACKGROUND ART

To ensure drainage performance, a pneumatic tire that employs a tread pattern in which four main grooves extending in a tire circumferential direction are formed in a tread portion and a plurality of lug grooves are formed in land portions defined by the main grooves has been variously proposed (for example, see Japan Unexamined Patent Publication Nos. 2019-051834 A and 2019-001406 A, and Japan Patent No. 5413500 B).

However, when groove areas of the main grooves and the lug grooves are increased, while drainage performance can be enhanced, there are problems in that steering stability and noise performance are deteriorated. Therefore, providing steering stability, noise performance, and drainage performance in a compatible manner at a high degree is not easy and further improvement is desired.

SUMMARY

The present technology provides a pneumatic tire whereby steering stability, noise performance, and drainage performance can be improved in a well-balanced manner.

A pneumatic tire according to the present technology may include a tread portion, a pair of sidewall portions, a pair of bead portions, and a mounting direction indicator. The tread portion may extend in a tire circumferential direction and have an annular shape. The pair of sidewall portions may be disposed on both sides of the tread portion. The pair of bead portions may be disposed on inner sides of the sidewall portions in a tire radial direction. The mounting direction indicator may indicate a mounting direction to a vehicle. The four main grooves extending in the tire circumferential direction may be formed in the tread portion. The four main grooves may include: an inner center main groove located on a vehicle inner side with respect to a tire equator when the pneumatic tire is mounted on the vehicle; an outer center main groove located on a vehicle outer side with respect to the tire equator when the pneumatic tire is mounted on the vehicle; an inner shoulder main groove located on the vehicle inner side with respect to the inner center main groove when the pneumatic tire is mounted on the vehicle; and an outer shoulder main groove located on the vehicle outer side with respect to the outer center main groove when the pneumatic tire is mounted on the vehicle. Five rows of land portions may be defined by the four main grooves. The five rows of the land portions may include: a center land portion defined between the inner center main groove and the outer center main groove; an inner intermediate land portion defined between the inner center main groove and the inner shoulder main groove; an outer intermediate land portion defined between the outer center main groove and the outer shoulder main groove; an inner shoulder land portion defined on the vehicle inner side with respect to the inner shoulder main groove; and an outer shoulder land portion defined on the vehicle outer side with respect to the outer shoulder main groove. While a plurality of inner intermediate lug grooves extending in a tire width direction and having one ends communicating with the inner center main groove and other ends terminating in the inner intermediate land portion may be formed at intervals in the tire circumferential direction in the inner intermediate land portion, a plurality of outer intermediate lug grooves extending in the tire width direction and having one ends communicating with the outer shoulder main groove and other ends terminating in the outer intermediate land portion may be formed at intervals in the tire circumferential direction in the outer intermediate land portion. A length $L1$ of the inner intermediate lug groove and a length $L2$ of the outer intermediate lug groove may satisfy a relationship $L1 > L2$. A distance $W1$ from the tire equator to a center position of the inner shoulder main groove, a distance $W2$ from the tire equator to a center position of the inner center main groove, a distance $W3$ from the tire equator to a center position of the outer center main groove, and a distance $W4$ from the tire equator to a center position of the outer shoulder main groove may satisfy relationships $0.58 \leq W1/Wi \leq 0.62$, $0.20 \leq W2/Wi \leq 0.24$, $0.15 \leq W3/Wo \leq 0.19$, and $0.53 \leq W4/Wo \leq 0.57$ with respect to distances $Wi$, $Wo$ from the tire equator to ground contact edges on the vehicle inner side and the vehicle outer side. A total value of a groove width $WG1$ of the inner shoulder main groove and a groove width $WG2$ of the inner center main groove may be larger than a total value of a groove width $WG3$ of the outer center main groove and a groove width $WG4$ of the outer shoulder main groove.

According to the present technology, in the pneumatic tire in which the mounting direction to the vehicle is designated, $W1/Wi$, $W2/Wi$, $W3/Wo$, and $W4/Wo$ are defined as described above, and the four main grooves are brought closer to the vehicle inner side when the tire is mounted on the vehicle, whereby it is possible to improve drainage performance while vehicle external noise is reduced. The total value of the groove width $WG1$ of the inner shoulder main and the groove width $WG2$ of the inner center main groove is larger than the total value of the groove width $WG3$ of the outer center main groove and the groove width $WG4$ of the outer shoulder main groove. Thus, drainage performance can be improved without deteriorating noise performance. In addition to the total value of the groove width $WG1$ of the inner shoulder main and the groove width $WG2$ of the inner center main groove being larger than the total value of the groove width $WG3$ of the outer center main groove and the groove width $WG4$ of the outer shoulder main groove, by configuring the length $L1$ of the inner intermediate lug groove larger than the length $L2$ of the outer intermediate lug groove, rigidity of the vehicle outer side part of the tread portion on which a large lateral force acts is made larger than rigidity of the vehicle inner side part of the tread portion, thus allowing improving steering stability on dry road surfaces and wet road surfaces. As a result, steering stability, noise performance, and drainage performance can be improved to a further high degree.

In the present technology, in the center land portion, a plurality of center lug grooves extending in the tire width direction and having one ends communicating with the inner center main groove and other ends terminating in the center land portion are preferably formed at intervals in the tire circumferential direction. By disposing the non-through center lug grooves in the center land portion, drainage performance can be improved without impairing steering stability.

In particular, the other ends of the center lug grooves preferably terminate within the center land portion without traversing the tire equator. By disposing the center lug grooves such that the center lug grooves do not go traversing the tire equator, the rigidity of the center land portion can be sufficiently ensured and drainage performance can be improved without deteriorating steering stability.

In the center land portion, a plurality of center sipes extending in the tire width direction and having one ends communicating with the outer center main groove and other ends terminating within the center land portion without traversing the tire equator are preferably formed at intervals in the tire circumferential direction. By disposing the center sipes such that the center sipes do not traverse the tire equator, the rigidity of the center land portion can be sufficiently ensured and drainage performance can be improved without deteriorating noise performance or steering stability.

A width Wr1 of the inner intermediate land portion and a length L1 of the inner intermediate lug groove preferably satisfy a relationship $0.6 \leq L1/Wr1 \leq 0.7$. A width Wr2 of the outer intermediate land portion and a length L2 of the outer intermediate lug groove preferably satisfy a relationship $0.4 \leq L2/Wr2 \leq 0.5$. A width Wr3 of the center land portion and a length L3 of the center lug groove preferably satisfy a relationship $0.3 \leq L3/Wr3 \leq 0.4$. By properly setting the length L1 of the inner intermediate lug groove, the length L2 of the outer intermediate lug groove, or the length L3 of the center lug groove, steering stability, noise performance, and drainage performance can be improved in a well-balanced manner.

An inclination angle θ1 on an acute angle side of the inner intermediate lug groove with respect to the tire circumferential direction is preferably smaller than an inclination angle θ2 on an acute angle side of the outer intermediate lug groove with respect to the tire circumferential direction. By setting the inclination angle θ1 of the inner intermediate lug groove to be smaller than the inclination angle θ2 of the outer intermediate lug groove in this manner, the rigidity of the inner intermediate lug groove can be ensured while good drainage performance is maintained. As a result, the steering stability on dry road surfaces and the steering stability on wet road surfaces can be improved in a well-balanced manner.

Groove walls on the vehicle outer sides of the inner shoulder main groove and the outer center main groove preferably have edge portions chamfered in a zigzag shape. By providing the edge portions where the groove walls on the vehicle outer sides of the inner shoulder main groove and the outer center main groove are chamfered in the zigzag shape, an initial groove area can be ensured and drainage performance can be improved without deteriorating noise.

The inner intermediate lug groove preferably has an inclined portion that is inclined such that a groove depth gradually shallows toward a terminal end side from a position 50% to 65% of the length L1 with an open end of the inner intermediate lug groove as a point of origin. The outer intermediate lug groove preferably has an inclined portion that is inclined such that a groove depth gradually shallows toward a terminal end side from a position 35% to 50% of the length L2 with an open end of the outer intermediate lug groove as a point of origin. The center lug groove preferably has an inclined portion that is inclined such that a groove depth gradually shallows toward a terminal end side from a position 25% to 40% of the length L3 with an open end of the center lug groove as a point of origin. By providing the inclined portion, the decrease in rigidity of each of the land portions can be avoided, thus allowing improving drainage performance without deteriorating steering stability.

In the present technology, the ground contact region of the tread portion is specified based on the ground contact width in a tire axial direction measured when a regular load is applied and the tire is placed vertically on a plane, in a state where the tire is inflated to a regular internal pressure and mounted on a regular rim. The ground contact edge is an outermost position in the tire axial direction of the ground contact region. "Regular rim" refers to a rim defined by a standard for each tire according to a system of standards that includes standards with which tires comply, and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. "Regular internal pressure" is an air pressure corresponding to the maximum load capacity determined for each tire by each standard in a standard system including the standard on which the tire is based. "Regular load" is a load equivalent to 80% of the maximum load capacity determined for each tire by each standard in a standard system including the standard on which the tire is based.

DETAILED DESCRIPTION

Figure 1:
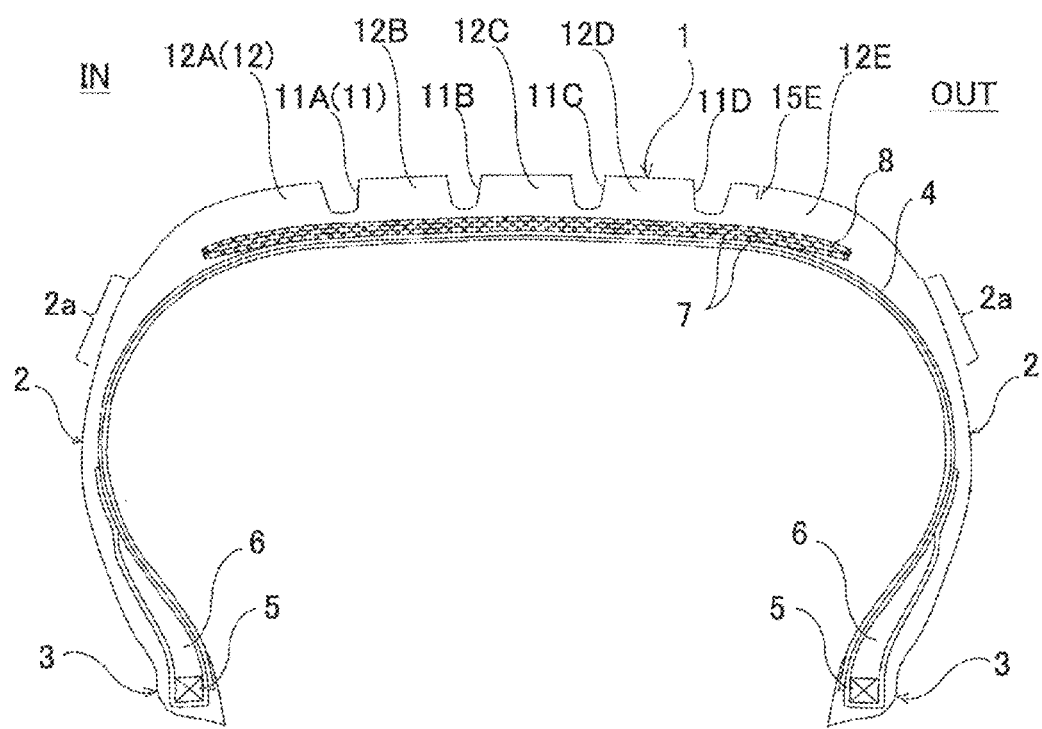
FIG. 1 is a meridian cross-sectional view illustrating a pneumatic tire according to an embodiment of the present technology.
Figure 2:
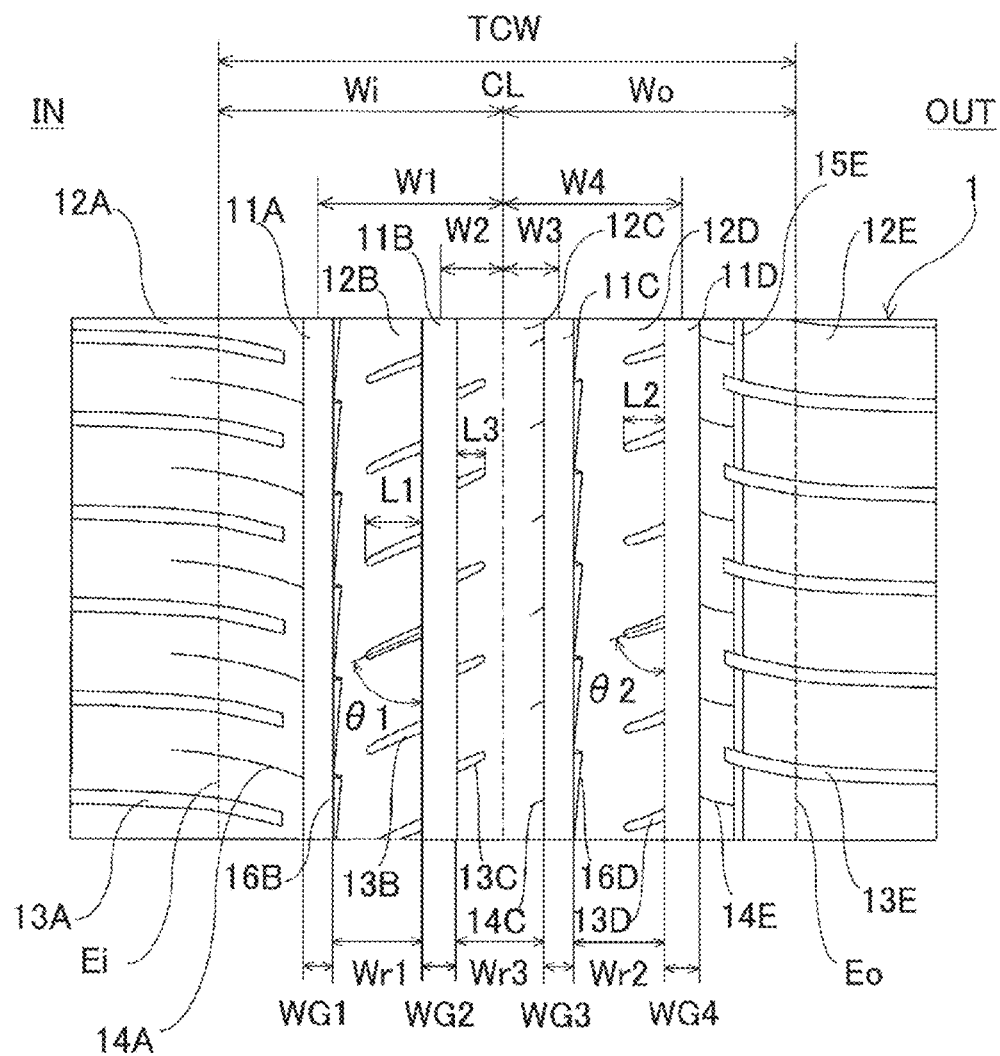
FIG. 2 is a developed view illustrating a tread pattern of the pneumatic tire of FIG. 1.
Figure 3:
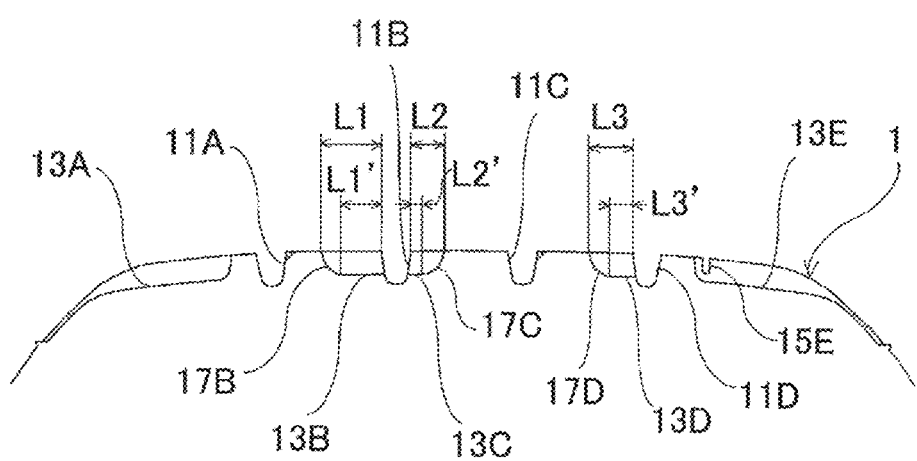
FIG. 3 is a contour diagram illustrating a contour of a meridian cross-section of a tread portion of the pneumatic tire in FIG. 1.

Configurations of embodiments of the present technology will be described in detail below with reference to the accompanying drawings. FIGS. 1 to 3 illustrate a pneumatic tire according to an embodiment of the present technology. This pneumatic tire has a mounting direction of tire front/back that is designated when mounted on a vehicle. In FIGS. 1 to 3, "IN" refers to a vehicle inner side when the tire is mounted on a vehicle, "OUT" refers to a vehicle outer side when the tire is mounted on the vehicle, Ei refers to a ground contact edge on the vehicle inner side, Eo refers to a ground contact edge on the vehicle outer side, and TCW refers to a ground contact width.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed on an inner side of the sidewall portions 2 in the tire radial direction. For example, a mounting direction indicator 2A indicating the mounting direction to the vehicle is formed on at least the sidewall portion 2 on the vehicle outer side. The mounting direction indicator 2A displays, for example, "OUTSIDE" along the tire circumferential direction on the vehicle outer side and displays, for example, "INSIDE" along the tire circumferential direction on the vehicle inner side.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5.

On the other hand, a plurality of belt layers 7 are embedded on the outer circumferential side of the carcass layer 4 in the tread portion 1. The belt layers 7 include a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall in a range from 10° to 40°, for example. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

As illustrated in FIG. 2, the tread portion 1 is formed with four main grooves 11 extending in the tire circumferential direction. The four main grooves 11 include an inner center main groove 11B located on a vehicle inner side with respect to a tire equator CL when the pneumatic tire is mounted on a vehicle, an outer center main groove 11C located on a vehicle outer side with respect to the tire equator CL when the pneumatic tire is mounted on a vehicle, an inner shoulder main groove 11A located on the vehicle inner side with respect to the inner center main groove 11B when the pneumatic tire is mounted on a vehicle, and an outer shoulder main groove 11D located on the vehicle outer side with respect to the outer center main groove 11C when the pneumatic tire is mounted on a vehicle. The main grooves 11 have groove widths ranging from 6.5 mm to 12.0 mm and groove depths ranging from 6.5 mm to 8.5 mm, and includes a wear indicator.

The tread portion 1 defines five rows of land portions 12 by the four main grooves 11. The five rows of the land portions 12 include a center land portion 12C defined between the inner center main groove 11B and the outer center main groove 11C, an inner intermediate land portion 12B defined between the inner center main groove 11B and the inner shoulder main groove 11A, an outer intermediate land portion 12D defined between the outer center main groove IC and the outer shoulder main groove 11D, an inner shoulder land portion 12A defined on the vehicle inner side with respect to the inner shoulder main groove 11A, and an outer shoulder land portion 12E defined on the vehicle outer side with respect to the outer shoulder main groove 11D.

In the inner shoulder land portion 12A, a plurality of inner shoulder lug grooves 13A extending in the tire width direction and having one ends extending to the vehicle inner side with respect to the ground contact edge Ei on the vehicle inner side and the other ends terminating in the inner shoulder land portion 12A are formed at intervals in the tire circumferential direction. Furthermore, in the inner shoulder land portion 12A, a plurality of inner shoulder sipes 14A extending in the tire width direction and having one ends communicating with the inner shoulder main groove 11A and the other ends terminating in the inner shoulder land portion 12A are formed at intervals in the tire circumferential direction.

In the inner intermediate land portion 12B, a plurality of inner intermediate lug grooves 13B extending in the tire width direction and having one ends communicating with the inner center main groove 11B and the other ends terminating in the inner intermediate land portion 12B are formed at intervals in the tire circumferential direction. In addition, on a groove wall on the vehicle outer side of the inner shoulder main groove 11A (that is, a side wall on the vehicle inner side of the inner intermediate land portion 12B), edge portions 16B chamfered in a zigzag shape are formed.

In the center land portion 12C, a plurality of center lug grooves 13C extending in the tire width direction and having one ends communicating with the inner center main groove 11B and the other ends terminating in the center land portion 12C are formed at intervals in the tire circumferential direction. In the center land portion 12C, a plurality of center sipes 14C extending in the tire width direction and having one ends communicating with the outer center main groove 11C and the other ends terminating in the center land portion 12C are formed at intervals in the tire circumferential direction.

In the outer intermediate land portion 12D, a plurality of outer intermediate lug grooves 13D extending in the tire width direction and having one ends communicating with the outer shoulder main groove 11D and the other ends terminating in the outer intermediate land portion 12D are formed at intervals in the tire circumferential direction. In addition, on a groove wall on the vehicle outer side of the outer center main groove IC (that is, a side wall on the vehicle inner side of the outer intermediate land portion 12D), edge portions 16D chamfered in a zigzag shape are formed.

In the outer shoulder land portion 12E, a plurality of outer shoulder lug grooves 13E extending in the tire width direction and having one ends extending to the vehicle outer side with respect to the ground contact edge Eo on the vehicle outer side and the other ends terminating in the outer shoulder land portion 12E are formed at intervals in the tire circumferential direction. In the outer shoulder land portion 12E, a circumferential auxiliary groove 15E extending in the tire circumferential direction and mutually connecting the outer shoulder lug grooves 13E is formed. In the outer shoulder land portion 12E, a plurality of outer shoulder sipes 14D extending in the tire width direction and having one ends communicating with the outer shoulder main groove 11D and the other ends communicating with the circumferential auxiliary groove 15E are formed at intervals in the tire circumferential direction.

In the pneumatic tire, the length L1 of the inner intermediate lug groove 13B and the length L2 of the outer intermediate lug groove 13D satisfy the relationship L1>L2. The lengths L1, L2 are measured in the tire width direction. By configuring the length L1 of the inner intermediate lug groove 13B larger than the length L2 of the outer intermediate lug groove 13D in this way, rigidity of the vehicle outer side part of the tread portion 1 (the outer intermediate land portion 12D) on which a large lateral force acts is made larger than rigidity of the vehicle inner side part of the tread portion 1 (the inner intermediate land portion 12B), thus allowing improving the steering stability on dry road surfaces and wet road surfaces.

In the pneumatic tire, a distance W1 from the tire equator CL to the center position of the inner shoulder main groove 11A, a distance W2 from the tire equator CL to the center position of the inner center main groove 11B, a distance W3 from the tire equator CL to the center position of the outer center main groove 11C, and a distance W4 from the tire equator CL to the center position of the outer shoulder main groove 11D satisfy the relationships $0.58 \leq W1/Wi \leq 0.62$, $0.20 \leq W2/Wi \leq 0.24$, $0.15 \leq W3/Wo \leq 0.19$, and $0.53 \leq W4/Wo \leq 0.57$ with respect to distances Wi, Wo from the tire equator CL to the ground contact edges Ei, Eo on the vehicle inner side and the vehicle outer side. The respective distances Wi and Wo from the tire equator CL to the ground contact edges Ei, Eo on the vehicle inner side and the vehicle outer side are equivalent to TCW/2. The center positions of the inner shoulder main groove 11A, the inner center main groove 11B, the outer center main groove 11C, and the outer shoulder main groove 11D are center positions in a groove width direction and center positions of the groove portions excluding the chamfered portions.

In the pneumatic tire in which the mounting direction to the vehicle is designated, W1/Wi, W2/Wi, W3/Wo, and W4/Wo are defined as described above, and the four main grooves are brought closer to the vehicle inner side when the tire is mounted on a vehicle, whereby it is possible to improve drainage performance while vehicle external noise is reduced. Here, when the center positions of the inner shoulder main groove 11A, the inner center main groove 11B, the outer center main groove 11C, and the outer shoulder main groove 11D are out of the ranges, it is difficult to provide noise performance and drainage performance in a compatible manner.

In the pneumatic tire, the total value of the groove width WG1 of the inner shoulder main groove 11A and the groove width WG2 of the inner center main groove 11B (WG1+WG2) is set to be larger than the total value of the groove width WG3 of the outer center main groove 11C and the groove width WG4 of the outer shoulder main groove 11D (WG3+WG4). Thus, drainage performance can be improved without deteriorating noise performance. Configuring the total value of the groove width WG1 of the inner shoulder main groove 1A and the groove width WG2 of the inner center main groove 11B to be larger than the total value of the groove width WG3 of the outer center main groove 11C and the groove width WG4 of the outer shoulder main groove 11D allows increasing the rigidity of the vehicle outer side part of the tread portion 1 where a large lateral force acts more than the rigidity of the vehicle inner side part of the tread portion 1, thus allowing improving the steering stability on dry road surfaces and wet road surfaces. In particular, the relationship $WG1 \geq WG2 > WG3 \geq WG4$ is preferably satisfied.

In the center land portion 12C of the pneumatic tire, the plurality of center lug grooves 13C extending in the tire width direction and having one ends communicating with the inner center main groove 11B and the other ends terminating in the center land portion 12C are preferably formed at intervals in the tire circumferential direction. By disposing the non-through center lug grooves 13C in the center land portion 12C, drainage performance can be improved without impairing steering stability.

When the center lug grooves 13C are provided, the other ends of the center lug grooves 13C preferably terminate within the center land portion 12C without traversing the tire equator CL. By disposing the center lug grooves 13C such that the center lug grooves 13C do not traverse the tire equator CL, the rigidity of the center land portion 12C can be sufficiently ensured, and drainage performance can be improved without deteriorating steering stability.

In the center land portion 12C of the pneumatic tire, the plurality of center sipes 14C extending in the tire width direction and having one ends communicating with the outer center main groove 11C and the other ends terminating within the center land portion 12C without traversing the tire equator CL are preferably formed at intervals in the tire circumferential direction. By disposing the center sipes 14C such that the center sipes 14C do not traverse the tire equator CL, the rigidity of the center land portion 12C can be sufficiently ensured and drainage performance can be improved without deteriorating noise performance or steering stability.

In the pneumatic tire, a width Wr1 of the inner intermediate land portion 12B and the length L1 of the inner intermediate lug groove 13B preferably satisfy the relationship $0.6 \leq L1/Wr1 \leq 0.7$. By properly setting the length L1 of the inner intermediate lug groove 13B, steering stability, noise performance, and drainage performance can be improved in a well-balanced manner. Here, the value of L1/Wr1 being less than 0.6 decreases the effect of improving drainage performance and whereas the value being larger than 0.7 decreases the effect of improving steering stability due to the decrease in rigidity of the inner intermediate land portion 12B and decreases the effect of improving noise performance.

In the pneumatic tire, a width Wr2 of the outer intermediate land portion 12D and the length L2 of the outer intermediate lug groove 13D preferably satisfy the relationship $0.4 \leq L2/Wr2 \leq 0.5$. By properly setting the length L2 of the outer intermediate lug groove 13D, steering stability, noise performance, and drainage performance can be improved in a well-balanced manner. Here, the value of L2/Wr2 being less than 0.4 decreases the effect of improving drainage performance and whereas the value being larger than 0.5 decreases the effect of improving steering stability due to the decrease in rigidity of the outer intermediate land portion 12D and decreases the effect of improving noise performance.

In the pneumatic tire, a width Wr3 of the center land portion 12C and a length L3 of the center lug groove 13C preferably satisfy the relationship $0.3 \leq L3/Wr3 \leq 0.4$. By properly setting the length L3 of the center lug groove 13C, steering stability, noise performance, and drainage performance can be improved in a well-balanced manner. Here, the value of L3/Wr3 being less than 0.3 decreases the effect of improving drainage performance and whereas the value being larger than 0.4 decreases the effect of improving steering stability due to the decrease in rigidity of the center land portion 12C and decreases the effect of improving noise performance.

In the pneumatic tire, an inclination angle $\theta 1$ on the acute angle side of the inner intermediate lug groove 13B with respect to the tire circumferential direction is preferably set to be smaller than an inclination angle $\theta 2$ on the acute angle side of the outer intermediate lug groove 13D with respect to the tire circumferential direction. The inclination angle $\theta 1$ is the angle formed by a straight line connecting the center position of the opening end of the inner intermediate lug groove 13B and the center position of the terminal end thereof with respect to the tire circumferential direction, and the inclination angle $\theta 2$ is the angle formed by a straight line connecting the center position of the opening end of the outer intermediate lug groove 13D and the center position of the terminal end thereof with respect to the tire circumferential direction. By setting the inclination angle $\theta 1$ of the inner intermediate lug groove 13B to be smaller than the inclination angle $\theta 2$ of the outer intermediate lug groove 13D in this manner, the rigidity of the inner intermediate lug groove 13B can be ensured while maintaining good drainage performance. As a result, the steering stability on dry road surfaces and the steering stability on wet road surfaces can be improved in a well-balanced manner. In particular, it is preferable that the inclination angle θ1 of the inner intermediate lug groove 13B is set in a range from 650 to 710 and the inclination angle θ2 of the outer intermediate lug groove 13D is set in a range from 720 to 78°.

In the pneumatic tire, the edge portions 16B, 16D chamfered in a zigzag shape are preferably formed on the groove walls on the vehicle outer sides of the inner shoulder main groove 11A and the outer center main groove IC, respectively. By providing the edge portions 16B, 16D where the groove walls on the vehicle outer sides of the inner shoulder main groove 11A and the outer center main groove IC are chamfered in the zigzag shape, the initial groove area can be ensured and drainage performance can be improved without deteriorating noise.

In the pneumatic tire, as illustrated in FIG. 3, the inner intermediate lug groove 13B, the center lug groove 13C, and the outer intermediate lug groove 13D have inclined portions 17B, 17C, 17D inclined such that the groove depths gradually decrease from the intermediate position toward the terminal end side in the longitudinal direction. More specifically, the groove depth of the inner intermediate lug groove 13B gradually shallows toward the terminal end side from a position away from the open end thereof as a point of origin by a distance L1' equivalent to 50% to 650% of the length L1. The groove depth of the outer intermediate lug groove 13D gradually shallows toward the terminal end side from a position away from the open end thereof as a point of origin by a distance L2' equivalent to 350% to 50% of the length L2. The groove depth of the center lug groove 13C gradually shallows toward the terminal end side from a position away from the open end thereof as a point of origin by a distance L3' equivalent to 25% to 40% of the length L3. By providing the inclined portions 17B, 17C, 17D, the decrease in rigidity of the inner intermediate lug groove 13B, the center lug groove 13C, or the outer intermediate lug groove 13D can be avoided, thus allowing improving drainage performance without deteriorating steering stability. Here, when the distances L1', L2', L3' are excessively small, the effect of improving drainage performance decreases, and when the distances L1', L2', L3' are excessively large, the effect of improving steering stability decreases.

EXAMPLES

Tires of Conventional Example, Comparative Examples 1 to 3, and Examples 1 to 8 having tire sizes of 215/55R17 94V that were pneumatic tires including tread portions, a pair of sidewall portions, a pair of bead portions, and mounting direction indicators indicating a mounting direction to a vehicle and in which, as illustrated in FIG. 2, four main grooves extending in the tire circumferential directions were formed in the tread portions, five rows of land portions were defined by the four main grooves, and lug grooves and sipes were formed in the land portions were manufactured.

In Conventional Example, Comparative Examples 1 to 3, and Examples 1 to 8, the distances Wi, Wo from the tire equator to the ground contact edges, the length L1 of the inner intermediate lug groove, the length L2 of the outer intermediate lug groove, the length L3 of the center lug groove, the distance W1 from the tire equator to the center position of the inner shoulder main groove, the distance W2 from the tire equator to the center position of the inner center main groove, the distance W3 from the tire equator to the center position of the outer center main groove, the distance W4 from the tire equator to the center position of the outer shoulder main groove, W1/Wi, W2/Wi, W3/Wo, W4/Wo, the total value of the groove width WG1 of the inner shoulder main groove and the groove width WG2 of the inner center main groove (WG1+WG2), the total value of the groove width WG3 of the outer center main groove and the groove width WG4 of the outer shoulder main groove (WG3+WG4), the termination position of a non-through center lug groove, presence of the non-through center sipe, the width Wr1 of the inner intermediate land portion, the width Wr2 of the outer intermediate land portion, the width Wr3 of the center land portion, L1/Wr1, L2/Wr2, L3/Wr3, the inclination angle θ1 of the inner intermediate lug groove, the inclination angle θ2 of the outer intermediate lug groove, presence of the chamfering in a zigzag shape on the groove walls on the vehicle outer sides of the inner shoulder main groove and the outer center main groove, the start position L1' of the inclined portion of the inner intermediate lug groove, the start position L2' of the inclined portion of the outer intermediate lug groove, the start position L3' of the inclined portion of the center lug groove, L1'/L1, L2'/L2, and L3'/L3 were set as in Table 1 and Table 2. Regarding the terminal end position of the non-through center lug groove, the case where the terminal end was on the tire equator was evaluated as "A" and the case where the terminal end was at a position not traversing the tire equator was evaluated as "B."

These test tires were evaluated for the steering stability on dry road surfaces, the steering stability on wet road surfaces, and noise performance by the following test methods, and the results are also given in Table 1 and Table 2.

Steering stability on dry road surfaces: Each test tire was mounted on a wheel with a rim size of 17×7J and mounted on a passenger vehicle with an engine displacement of 2500 cc, air pressure (F/R) after warm-up was set to 230 kPa/220 kPa, and sensory evaluation during traveling on dry road surfaces was conducted by a test driver. Evaluation results are expressed as index values with the value of Conventional Example being defined as 100. Larger index values indicate superior steering stability on dry road surfaces.

Steering stability on wet road surfaces: Each test tire was mounted on a wheel with a rim size of 17×7 J and mounted on a passenger vehicle with an engine displacement of 2500 cc, air pressure (F/R) after warm-up was set to 230 kPa/220 kPa, and sensory evaluation during traveling on wet road surfaces was conducted by a test driver. Evaluation results are expressed as index values with the value of Conventional Example being defined as 100. Larger index values indicate superior steering stability on wet road surfaces.

Noise performance: Each test tire was mounted on a wheel with a rim size of 17×7 J and mounted on a passenger vehicle with an engine displacement of 2500 cc, air pressure (F/R) after warm-up was set to 230 kPa/220 kPa, and a measurement test for vehicle external noise compliant with ECE R117 was conducted to measure the vehicle external noise. Evaluation results are expressed as index values, using the reciprocals of the measurement values, with the value of Conventional Example being defined as 100. Larger index values mean lower vehicle external noise and better noise performance.

TABLE 1-1

|  |  | Conventional Example | Comparative Example 1 | Comparative Example 2 |
|---|---|---|---|---|
| Distances Wi, Wo to ground contact edges (mm) |  | 81 | 81 | 81 |
| Length of lug groove | L1 (mm) | 6.4 | 6.4 | 15 |
|  | L2 (mm) | 18 | 18 | 11 |
|  | L3 (mm) | 12.3 | 12.3 | 12.3 |
| Center position of main groove | W1 (mm) | 47 | 48 | 46 |
|  | W2 (mm) | 15.8 | 16.8 | 14.8 |
|  | W3 (mm) | 15.8 | 14.8 | 16.8 |
|  | W4 (mm) | 47 | 46 | 48 |
|  | W1/Wi | 0.58 | 0.59 | 0.57 |
|  | W2/Wi | 0.20 | 0.21 | 0.18 |
|  | W3/Wo | 0.20 | 0.18 | 0.21 |
|  | W4/Wo | 0.58 | 0.57 | 0.59 |
| Groove width of main groove | WG1 + WG2 (mm) | 14.9 | 15.2 | 15.2 |
|  | WG3 + WG4 (mm) | 14.9 | 14.6 | 14.6 |
| Termination position of non-through center lug groove |  | A | A | A |
| Presence of non-through center sipe |  | No | No | No |
| Land portion width | Wr1 (mm) | 24 | 24 | 23.7 |
|  | Wr2 (mm) | 24 | 24 | 24.3 |
|  | Wr3 (mm) | 24.6 | 24.6 | 24.6 |
|  | L1/Wr1 | 0.27 | 0.27 | 0.63 |
|  | L2/Wr2 | 0.75 | 0.75 | 0.45 |
|  | L3/Wr3 | 0.50 | 0.50 | 0.50 |
| Inclination angle of lug groove | θ1 (°) | 54 | 54 | 54 |
|  | θ2 (°) | 54 | 54 | 54 |
| Presence of chamfering in zigzag shape | Inner shoulder main groove | No | No | No |
|  | Outer center main groove | Yes | Yes | Yes |
| Start position of inclined portion of lug groove | L1' (mm) | — | — | — |
|  | L2' (mm) | 2.5 | 2.5 | 2.5 |
|  | L3' (mm) | 2.5 | 2.5 | 2.5 |
|  | L1'/L1 | — | — | — |
|  | L2'/L2 | 0.14 | 0.23 | 0.23 |
|  | L3'/L3 | 0.20 | 0.20 | 0.20 |
| Steering stability on dry road surfaces (index value) |  | 100 | 100 | 100 |
| Steering stability on wet road surfaces (index value) |  | 100 | 100 | 99 |
| Noise performance (index value) |  | 100 | 102 | 99 |

TABLE 1-2

|  |  | Comparative Example 3 | Example 1 | Example 2 |
|---|---|---|---|---|
| Distances Wi, Wo to ground contact edges (mm) |  | 81 | 81 | 81 |
| Length of lug groove | L1 (mm) | 15 | 15 | 15 |
|  | L2 (mm) | 11 | 11 | 11 |
|  | L3 (mm) | 12.3 | 12.3 | 7 |
| Center position of main groove | W1 (mm) | 48 | 48 | 48 |
|  | W2 (mm) | 16.8 | 16.8 | 16.8 |
|  | W3 (mm) | 14.8 | 14.8 | 14.8 |
|  | W4 (mm) | 46 | 46 | 46 |
|  | W1/Wi | 0.59 | 0.59 | 0.59 |
|  | W2/Wi | 0.21 | 0.21 | 0.21 |
|  | W3/Wo | 0.18 | 0.18 | 0.18 |
|  | W4/Wo | 0.57 | 0.57 | 0.57 |
| Groove width of main groove | WG1 + WG2 (mm) | 14.6 | 15.2 | 15.2 |
|  | WG3 + WG4 (mm) | 15.2 | 14.6 | 14.6 |
| Termination position of non-through center lug groove |  | A | A | B |
| Presence of non-through center sipe |  | No | No | Yes |
| Land portion width | Wr1 (mm) | 24.3 | 24 | 24 |
|  | Wr2 (mm) | 23.7 | 24 | 24 |
|  | Wr3 (mm) | 24.6 | 24.6 | 24 |
|  | L1/Wr1 | 0.62 | 0.63 | 0.63 |
|  | L2/Wr2 | 0.46 | 0.46 | 0.46 |
|  | L3/Wr3 | 0.50 | 0.50 | 0.29 |
| Inclination angle of lug groove | θ1 (°) | 54 | 54 | 54 |
|  | θ2 (°) | 54 | 54 | 54 |
| Presence of chamfering in zigzag shape | Inner shoulder main groove | No | No | No |
|  | Outer center main groove | Yes | Yes | Yes |
| Start position of inclined portion of lug groove | L1' (mm) | — | — | — |
|  | L2' (mm) | 2.5 | 2.5 | 2.5 |
|  | L3' (mm) | 2.5 | 2.5 | 2.5 |
|  | L1'/L1 | — | — | — |
|  | L2'/L2 | 0.23 | 0.23 | 0.23 |
|  | L3'/L3 | 0.20 | 0.20 | 0.36 |
| Steering stability on dry road surfaces (index value) |  | 99 | 100 | 101 |
| Steering stability on wet road surfaces (index value) |  | 99 | 102 | 102 |
| Noise performance (index value) |  | 99 | 102 | 103 |

TABLE 2-1

|  |  | Example 3 | Example 4 | Example 5 |
|---|---|---|---|---|
| Distances Wi, Wo to ground contact edges (mm) | | 81 | 81 | 81 |
| Length of lug groove | L1 (mm) | 15 | 15 | 15 |
| | L2 (mm) | 11 | 11 | 11 |
| | L3 (mm) | 8.3 | 8.3 | 8.3 |
| Center position of main groove | W1 (mm) | 48 | 48 | 48 |
| | W2 (mm) | 16.8 | 16.8 | 16.8 |
| | W3 (mm) | 14.8 | 14.8 | 14.8 |
| | W4 (mm) | 46 | 46 | 46 |
| | W1/Wi | 0.59 | 0.59 | 0.59 |
| | W2/Wi | 0.21 | 0.21 | 0.21 |
| | W3/Wo | 0.18 | 0.18 | 0.18 |
| | W4/Wo | 0.57 | 0.57 | 0.57 |
| Groove width of main groove | WG1 + WG2 (mm) | 15.2 | 15.2 | 15.2 |
| | WG3 + WG4 (mm) | 14.6 | 14.6 | 14.6 |
| Termination position of non-through center lug groove | | B | B | B |
| Presence of non-through center sipe | | Yes | Yes | Yes |
| Land portion width | Wr1 (mm) | 24 | 24 | 24 |
| | Wr2 (mm) | 24 | 24 | 24 |
| | Wr3 (mm) | 24 | 24 | 24 |
| | L1/Wr1 | 0.63 | 0.63 | 0.63 |
| | L2/Wr2 | 0.46 | 0.46 | 0.46 |
| | L3/Wr3 | 0.35 | 0.35 | 0.35 |
| Inclination angle of lug groove | $\theta 1$ (°) | 54 | 65 | 65 |
| | $\theta 2$ (°) | 54 | 72 | 72 |
| Presence of chamfering in zigzag shape | Inner shoulder main groove | No | No | Yes |
| | Outer center main groove | Yes | Yes | Yes |
| Start position of inclined portion of lug groove | L1' (mm) | — | — | — |
| | L2' (mm) | 2.5 | 2.5 | 2.5 |
| | L3' (mm) | 2.5 | 2.5 | 2.5 |
| | L1'/L1 | — | — | — |
| | L2'/L2 | 0.23 | 0.23 | 0.23 |
| | L3'/L3 | 0.30 | 0.30 | 0.30 |
| Steering stability on dry road surfaces (index value) | | 101 | 102 | 102 |
| Steering stability on wet road surfaces (index value) | | 103 | 103 | 105 |
| Noise performance (index value) | | 103 | 104 | 104 |

TABLE 2-2

|  |  | Example 6 | Example 7 | Example 8 |
|---|---|---|---|---|
| Distances Wi, Wo to ground contact edges (mm) | | 81 | 81 | 81 |
| Length of lug groove | L1 (mm) | 15 | 15 | 15 |
| | L2 (mm) | 11 | 11 | 11 |
| | L3 (mm) | 8.3 | 8.3 | 8.3 |
| Center position of main groove | W1 (mm) | 48 | 48 | 48 |
| | W2 (mm) | 16.8 | 16.8 | 16.8 |
| | W3 (mm) | 14.8 | 14.8 | 14.8 |
| | W4 (mm) | 46 | 46 | 46 |
| | W1/Wi | 0.59 | 0.59 | 0.59 |
| | W2/Wi | 0.21 | 0.21 | 0.21 |
| | W3/Wo | 0.18 | 0.18 | 0.18 |
| | W4/Wo | 0.57 | 0.57 | 0.57 |
| Groove width of main groove | WG1 + WG2 (mm) | 15.2 | 15.2 | 15.2 |
| | WG3 + WG4 (mm) | 14.6 | 14.6 | 14.6 |
| Termination position of non-through center lug groove | | B | B | B |
| Presence of non-through center sipe | | Yes | Yes | Yes |
| Land portion width | Wr1 (mm) | 24 | 24 | 24 |
| | Wr2 (mm) | 24 | 24 | 24 |
| | Wr3 (mm) | 24 | 24 | 24 |
| | L1/Wr1 | 0.63 | 0.63 | 0.63 |
| | L2/Wr2 | 0.46 | 0.46 | 0.46 |
| | L3/Wr3 | 0.35 | 0.35 | 0.35 |
| Inclination angle of lug groove | $\theta 1$ (°) | 65 | 65 | 65 |
| | $\theta 2$ (°) | 72 | 72 | 72 |
| Presence of chamfering in zigzag shape | Inner shoulder main groove | Yes | Yes | Yes |
| | Outer center main groove | Yes | Yes | Yes |
| Start position of inclined portion of lug groove | L1' (mm) | 9 | 9 | 9 |
| | L2' (mm) | 2.5 | 5.3 | 5.3 |
| | L3' (mm) | 2.5 | 2.5 | 2.5 |
| | L1'/L1 | 0.6 | 0.6 | 0.6 |
| | L2'/L2 | 0.23 | 0.48 | 0.48 |
| | L3'/L3 | 0.30 | 0.30 | 0.30 |

TABLE 2-2-continued

|  | Example 6 | Example 7 | Example 8 |
|---|---|---|---|
| Steering stability on dry road surfaces (index value) | 103 | 104 | 105 |
| Steering stability on wet road surfaces (index value) | 105 | 105 | 105 |
| Noise performance (index value) | 104 | 104 | 105 |

As can be seen from Table 1 and Table 2, the tires of Examples 1 to 8 have been totally good in the steering stability on dry road surfaces, the steering stability on wet road surfaces, and noise performance in comparison with Conventional Example. On the other hand, in Comparative Example 1, since the length L1 of the inner intermediate lug groove was smaller than the length L2 of the outer intermediate lug groove, the effect of improving the steering stability on dry road surfaces and wet road surfaces was insufficient. In Comparative Example 2, since the four main grooves were brought closer to the vehicle outer side when the tire was mounted on the vehicle, not only noise performance was deteriorated but also the steering stability on wet road surfaces was deteriorated. In Comparative Example 3, since the total value of the groove width WG1 of the inner shoulder main groove and the groove width WG2 of the inner center main groove (WG1+WG2) was smaller than the total value of the groove width WG3 of the outer center main groove and the groove width WG4 of the outer shoulder main groove (WG3+WG4), not only noise performance was deteriorated but also the steering stability on dry road surfaces and wet road surfaces was deteriorated.

The invention claimed is:

1. A pneumatic tire, comprising:
a tread portion extending in a tire circumferential direction and having an annular shape;
a pair of sidewall portions disposed on both sides of the tread portion;
a pair of bead portions disposed on inner sides of the sidewall portions in a tire radial direction; and
a mounting direction indicator indicating a mounting direction to a vehicle,
four main grooves extending in the tire circumferential direction being formed in the tread portion,
the four main grooves comprising:
an inner center main groove located on a vehicle inner side with respect to a tire equator when the pneumatic tire is mounted on the vehicle;
an outer center main groove located on a vehicle outer side with respect to the tire equator when the pneumatic tire is mounted on the vehicle;
an inner shoulder main groove located on the vehicle inner side with respect to the inner center main groove when the pneumatic tire is mounted on the vehicle; and
an outer shoulder main groove located on the vehicle outer side with respect to the outer center main groove when the pneumatic tire is mounted on the vehicle,
five rows of land portions being defined by the four main grooves,
the five rows of the land portions comprising:
a center land portion defined between the inner center main groove and the outer center main groove;
an inner intermediate land portion defined between the inner center main groove and the inner shoulder main groove;
an outer intermediate land portion defined between the outer center main groove and the outer shoulder main groove;
an inner shoulder land portion defined on the vehicle inner side with respect to the inner shoulder main groove; and
an outer shoulder land portion defined on the vehicle outer side with respect to the outer shoulder main groove,
while a plurality of inner intermediate lug grooves extending in a tire width direction and having one ends communicating with the inner center main groove and other ends terminating in the inner intermediate land portion are formed at intervals in the tire circumferential direction in the inner intermediate land portion,
a plurality of outer intermediate lug grooves extending in the tire width direction and having one ends communicating with the outer shoulder main groove and other ends terminating in the outer intermediate land portion are formed at intervals in the tire circumferential direction in the outer intermediate land portion,
a length L1 of the inner intermediate lug groove and a length L2 of the outer intermediate lug groove satisfy a relationship L1>L2,
a distance W1 from the tire equator to a center position of the inner shoulder main groove, a distance W2 from the tire equator to a center position of the inner center main groove, a distance W3 from the tire equator to a center position of the outer center main groove, and a distance W4 from the tire equator to a center position of the outer shoulder main groove satisfying relationships $0.58 \leq W1/Wi \leq 0.62$, $0.20 \leq W2/Wi \leq 0.24$, $0.15 \leq W3/Wo \leq 0.19$, and $0.53 \leq W4/Wo \leq 0.57$ with respect to distances Wi, Wo from the tire equator to ground contact edges on the vehicle inner side and the vehicle outer side, and
a total value of a groove width WG1 of the inner shoulder main groove and a groove width WG2 of the inner center main groove is larger than a total value of a groove width WG3 of the outer center main groove and a groove width WG4 of the outer shoulder main groove.

2. The pneumatic tire according to claim 1, wherein
in the center land portion, a plurality of center sipes extending in the tire width direction and having one ends communicating with the outer center main groove and other ends terminating within the center land portion without traversing the tire equator are formed at intervals in the tire circumferential direction.

3. The pneumatic tire according to claim 1, wherein
a width Wr1 of the inner intermediate land portion and a length L1 of the inner intermediate lug groove satisfy a relationship $0.6 \leq L1/Wr1 \leq 0.7$.

4. The pneumatic tire according to claim 1, wherein
a width Wr2 of the outer intermediate land portion and a length L2 of the outer intermediate lug groove satisfy a relationship $0.4 \leq L2/Wr2 \leq 0.5$.

5. The pneumatic tire according to claim 1, wherein
an inclination angle θ1 on an acute angle side of the inner intermediate lug groove with respect to the tire circumferential direction is smaller than an inclination angle θ2 on an acute angle side of the outer intermediate lug groove with respect to the tire circumferential direction.

6. The pneumatic tire according to claim 1, wherein groove walls on the vehicle outer sides of the inner shoulder main groove and the outer center main groove have edge portions chamfered in a zigzag shape.

7. The pneumatic tire according to claim 1, wherein the inner intermediate lug groove has an inclined portion that is inclined such that a groove depth gradually shallows toward a terminal end side from a position 50% to 65% of the length L1 with an open end of the inner intermediate lug groove as a point of origin.

8. The pneumatic tire according to claim 1, wherein the outer intermediate lug groove has an inclined portion that is inclined such that a groove depth gradually shallows toward a terminal end side from a position 35% to 50% of the length L2 with an open end of the outer intermediate lug groove as a point of origin.

9. The pneumatic tire according to claim 1, wherein the inner and outer intermediate land portions are formed without any sipes.

10. The pneumatic tire according to claim 1, wherein the plurality of inner intermediate lug grooves are the only lug grooves formed in the inner intermediate land portion and the plurality of outer intermediate lug grooves are the only lug grooves formed in the outer intermediate land portion.

11. The pneumatic tire according to claim 10, wherein the inner and outer intermediate land portions are formed without any sipes.

12. The pneumatic tire according to claim 1, wherein in the center land portion, a plurality of center lug grooves extending in the tire width direction and having one ends communicating with the inner center main groove and other ends terminating in the center land portion are formed at intervals in the tire circumferential direction.

13. The pneumatic tire according to claim 12, wherein the center lug groove has an inclined portion that is inclined such that a groove depth gradually shallows toward a terminal end side from a position 25% to 40% of the length L3 with an open end of the center lug groove as a point of origin.

14. The pneumatic tire according to claim 12, wherein a width Wr3 of the center land portion and a length L3 of the center lug groove satisfy a relationship $0.3 \leq L3/Wr3 \leq 0.4$.

15. The pneumatic tire according to claim 12, wherein the other ends of the center lug grooves terminate within the center land portion without traversing the tire equator.

16. The pneumatic tire according to claim 15, wherein a width Wr3 of the center land portion and a length L3 of the center lug groove satisfy a relationship $0.3 \leq L3/Wr3 \leq 0.4$.

17. The pneumatic tire according to claim 15, wherein in the center land portion, a plurality of center sipes extending in the tire width direction and having one ends communicating with the outer center main groove and other ends terminating within the center land portion without traversing the tire equator are formed at intervals in the tire circumferential direction.

18. The pneumatic tire according to claim 17, wherein a width Wr1 of the inner intermediate land portion and a length L1 of the inner intermediate lug groove satisfy a relationship $0.6 \leq L1/Wr1 \leq 0.7$.

19. The pneumatic tire according to claim 18, wherein a width Wr2 of the outer intermediate land portion and a length L2 of the outer intermediate lug groove satisfy a relationship $0.4 \leq L2/Wr2 \leq 0.5$.

20. The pneumatic tire according to claim 19, wherein an inclination angle θ1 on an acute angle side of the inner intermediate lug groove with respect to the tire circumferential direction is smaller than an inclination angle θ2 on an acute angle side of the outer intermediate lug groove with respect to the tire circumferential direction.

21. The pneumatic tire according to claim 20, wherein groove walls on the vehicle outer sides of the inner shoulder main groove and the outer center main groove have edge portions chamfered in a zigzag shape.

22. The pneumatic tire according to claim 21, wherein the inner intermediate lug groove has an inclined portion that is inclined such that a groove depth gradually shallows toward a terminal end side from a position 50% to 65% of the length L1 with an open end of the inner intermediate lug groove as a point of origin.

23. The pneumatic tire according to claim 22, wherein the outer intermediate lug groove has an inclined portion that is inclined such that a groove depth gradually shallows toward a terminal end side from a position 35% to 50% of the length L2 with an open end of the outer intermediate lug groove as a point of origin.

* * * * *